US010415468B2

(12) United States Patent
Ackermann et al.

(10) Patent No.: US 10,415,468 B2
(45) Date of Patent: Sep. 17, 2019

(54) GAS TURBINE ENGINE BUFFER SYSTEM

(75) Inventors: William K. Ackermann, East Hartford, CT (US); Peter M. Munsell, Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1592 days.

(21) Appl. No.: 13/366,447

(22) Filed: Feb. 6, 2012

(65) Prior Publication Data
US 2013/0192252 A1 Aug. 1, 2013

Related U.S. Application Data

(60) Provisional application No. 61/592,925, filed on Jan. 31, 2012.

(51) Int. Cl.
*F02C 6/08* (2006.01)
*F01D 11/04* (2006.01)
*F01D 25/16* (2006.01)
*F02C 7/06* (2006.01)
*F02C 7/28* (2006.01)
*F02C 9/18* (2006.01)
*F01D 25/12* (2006.01)
*F02C 7/18* (2006.01)

(52) U.S. Cl.
CPC ............... *F02C 6/08* (2013.01); *F01D 11/04* (2013.01); *F01D 25/125* (2013.01); *F01D 25/16* (2013.01); *F02C 7/06* (2013.01); *F02C 7/185* (2013.01); *F02C 7/28* (2013.01); *F02C 9/18* (2013.01); *F05D 2260/202* (2013.01); *F05D 2260/213* (2013.01); *Y02T 50/676* (2013.01)

(58) Field of Classification Search
USPC .... 60/39.83, 782, 784, 785, 39.08; 184/6.11
See application file for complete search history.

(56) References Cited

U.S. PATENT DOCUMENTS

| | | | | |
|---|---|---|---|---|
| 2,584,899 A | * | 2/1952 | McLeod | 415/115 |
| 2,636,665 A | | 4/1953 | Lombard | |
| 3,287,906 A | | 11/1966 | McCormick | |
| 3,527,317 A | * | 9/1970 | Motsinger | F02K 1/34 181/206 |

(Continued)

FOREIGN PATENT DOCUMENTS

| | | |
|---|---|---|
| GB | 1095129 | 12/1967 |
| GB | 1386481 a * | 3/1975 |

(Continued)

OTHER PUBLICATIONS

Extended European Search Report for Application No. EP 13 77 4935 dated Aug. 19, 2015.

(Continued)

*Primary Examiner* — Steven M Sutherland
(74) *Attorney, Agent, or Firm* — Carlson, Gaskey & Olds

(57) ABSTRACT

A gas turbine engine includes a buffer system that communicates a buffer cooling air to at least one bearing structure and at least one shaft of the gas turbine engine. The buffer system includes a first bleed air supply and a conditioning device that conditions the first bleed air supply to render the first buffer supply air at an acceptable temperature to pressurize the at least one bearing structure and cool the at least one shaft.

6 Claims, 5 Drawing Sheets

(56) References Cited

U.S. PATENT DOCUMENTS

| | | |
|---|---|---|
| 3,754,484 A | 8/1973 | Roberts |
| 3,844,110 A | 10/1974 | Widlansky et al. |
| 3,892,358 A | 7/1975 | Gisslen |
| 3,925,979 A | 12/1975 | Ziegler |
| 3,940,092 A * | 2/1976 | Farris .................. 244/12.5 |
| 4,130,872 A | 12/1978 | Harloff |
| 4,497,172 A * | 2/1985 | Smith .................. 60/226.1 |
| 4,502,274 A * | 3/1985 | Girault .................. 60/39.08 |
| 4,574,584 A * | 3/1986 | Hovan .................. 60/782 |
| 4,576,547 A | 3/1986 | Weiner et al. |
| 4,653,267 A * | 3/1987 | Brodell et al. .................. 60/782 |
| 4,709,545 A * | 12/1987 | Stevens et al. .................. 60/39.08 |
| 4,782,658 A | 11/1988 | Perry |
| 4,863,354 A | 9/1989 | Asselin et al. |
| 5,072,781 A | 12/1991 | Goodman |
| 5,305,616 A | 4/1994 | Coffinberry |
| 5,311,734 A | 5/1994 | Pope et al. |
| 5,433,674 A | 7/1995 | Sheridan et al. |
| 5,447,411 A | 9/1995 | Curley et al. |
| 5,472,313 A | 12/1995 | Quinones et al. |
| 5,482,431 A * | 1/1996 | Taylor .................. 415/111 |
| 5,524,847 A | 6/1996 | Brodell et al. |
| 5,573,378 A | 11/1996 | Barcza |
| 5,586,860 A | 12/1996 | Bertrand et al. |
| 5,685,158 A | 11/1997 | Lenahan et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,035,627 A * | 3/2000 | Liu .................. 60/785 |
| 6,223,616 B1 | 5/2001 | Sheridan |
| 6,318,070 B1 | 11/2001 | Rey et al. |
| 6,516,618 B1 * | 2/2003 | Bock .................. 60/782 |
| 6,520,742 B1 | 2/2003 | Forrester et al. |
| 6,550,253 B2 * | 4/2003 | Mortzheim et al. .................. 60/782 |
| 6,732,502 B2 | 5/2004 | Seda et al. |
| 6,814,541 B2 | 11/2004 | Evans et al. |
| 7,021,042 B2 | 4/2006 | Law |
| 7,090,466 B2 | 8/2006 | Honkomp et al. |
| 7,147,440 B2 | 12/2006 | Benjamin et al. |
| 7,159,402 B2 | 1/2007 | Hein et al. |
| 7,287,384 B2 * | 10/2007 | Fish et al. .................. 60/782 |
| 7,377,098 B2 | 5/2008 | Walker et al. |
| 7,448,221 B2 | 11/2008 | Suciu et al. |
| 7,591,754 B2 | 9/2009 | Duong et al. |
| 7,658,077 B2 | 2/2010 | Earith et al. |
| 7,824,305 B2 | 11/2010 | Duong et al. |
| 7,926,260 B2 | 4/2011 | Sheridan et al. |
| 8,061,657 B2 | 11/2011 | Rocklin et al. |
| 8,205,432 B2 | 6/2012 | Sheridan |
| 2003/0046938 A1 | 3/2003 | Mortzheim et al. |
| 2007/0220899 A1 | 9/2007 | Earith Thomas et al. |
| 2008/0115503 A1 * | 5/2008 | Vasquez et al. .................. 60/785 |
| 2009/0097967 A1 * | 4/2009 | Smith et al. .................. 415/145 |
| 2009/0104020 A1 | 4/2009 | Roush et al. |
| 2010/0092116 A1 | 4/2010 | Franconi |
| 2010/0148396 A1 | 6/2010 | Xie et al. |
| 2010/0162683 A1 | 7/2010 | Grabowski et al. |
| 2010/0164234 A1 | 7/2010 | Bowman et al. |
| 2010/0170262 A1 | 7/2010 | Kaslusky et al. |
| 2010/0236216 A1 | 9/2010 | Winter et al. |
| 2010/0331139 A1 | 12/2010 | McCune |
| 2011/0047959 A1 | 3/2011 | DiBenedetto |
| 2013/0202403 A1 | 8/2013 | Morin et al. |

FOREIGN PATENT DOCUMENTS

| | | |
|---|---|---|
| GB | 1516041 | 6/1978 |
| GB | 2041090 | 9/1980 |
| WO | 2007038674 | 4/2007 |

OTHER PUBLICATIONS

Extended European Search Report for Application No. EP 13 77 5763 dated Aug. 26, 2015.

Aero-Engine Design: From State of the Art Turbofans Towards Innovative Architectures, Mar. 3-7, 2008; von Karman Institute for Fluid Dynamics, Chaussee de Waterloo, 72, B-1640 Rhode Saint Genese—Belgium; Lecture Series 2008-03; ISN0377-8312; 26 pages.

Dr. Gunter Wilfert, MTU Aero Engines, Germany; Geared Fan; XP003035510; 76 pages.

Crichton, et al.; Design and Operation for Ultra Low Noise Take-Off; 45th AIAA Aerospace Sciences Meeting and Exhibit; Jan. 8-11, 2007, Reno, Nevada; AIAA 2007-456; 18 pages.

Malzacher, et al.; Aerodesign and Testing of an Aeromechanically Highly Loaded LP Turbine; Journal of Turbomachinery, Oct. 2006, vol. 128, pp. 643-649; http://turbomachinery.asmedigitalcollection.asme.org.

Wilfert, et al.; Clean-Validation of a High Efficient Low NOx Core, a GTF High Speed Turbine and an Integration of a Recuperator in an Environment Friendly Engine Concept; 41st AIAA/ASME/SAE/ASEE Joint Propulsion Conference & Exhibit, Jul. 10-13, 2005, Tuscon Arizona; AIAA 2005-4195; pp. 1-11.

Wilfert, et al.; Clean-Validation of a GTF High Speed Turbine and Integration of Heat Exchanger Technology in an Environmental Friendly Engine Concept; ISABE-2005-1156; pp. 1-8.

Riegler, et al.; The Geared Turbofan Technology—Opportunities, Challenges and Readiness Status; 10 pages.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. And Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

(56) References Cited

OTHER PUBLICATIONS

Brennan, P.J. And Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau K. Gu, C. and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

* cited by examiner

GAS TURBINE ENGINE BUFFER SYSTEM

CROSS-REFERENCE TO RELATED APPLICATIONS

This application claims priority to U.S. Provisional Application No. 61/592,925 which was filed on Jan. 31, 2012.

BACKGROUND

This disclosure relates to a gas turbine engine, and more particularly to a buffer system that can provide buffer cooling air to cool portions of the gas turbine engine, including at least one shaft of the gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine modes.

Gas turbine engines typically include shafts that support a plurality of airfoil supporting rotors of the compressor section and the turbine section. For example, in a two-spool turbofan engine, an inner shaft (i.e., a low speed shaft) and an outer shaft (i.e., a high speed shaft) can be incorporated. These shafts, in particular the inner shaft, can be exposed to relatively high torque loading and stresses that result from size limitations caused by the need for the shaft to traverse the rotor structure inboard of the radially inner disk bores.

SUMMARY

A gas turbine engine includes a buffer system that communicates a buffer cooling air to at least one bearing structure and at least one shaft of the gas turbine engine. The buffer system includes a first bleed air supply and a conditioning device that conditions the first bleed air supply to render the first buffer supply air at an acceptable temperature to pressurize the at least one bearing structure and cool the at least one shaft.

In a further embodiment of the foregoing gas turbine engine embodiment, the at least one shaft can be an inner shaft that interconnects a low pressure compressor and a low pressure turbine of the gas turbine engine.

In a further embodiment of either of the foregoing gas turbine engine embodiments, the at least one shaft can be an outer shaft that interconnects a high pressure and a high pressure turbine of the gas turbine engine.

In a further embodiment of any of the foregoing gas turbine engine embodiments, the at least one shaft can include an outer shaft that surrounds an inner shaft, and the buffer cooling air can be communicated between the inner shaft and the outer shaft.

In a further embodiment of any of the foregoing gas turbine engine embodiments, the outer shaft can include a tie shaft.

In a further embodiment of any of the foregoing gas turbine engine embodiments, the buffer cooling air can be communicated axially through an inner diameter of the at least one shaft.

In a further embodiment of any of the foregoing gas turbine engine embodiments, the buffer cooling air can be communicated axially along an outer diameter of the at least one shaft.

In a further embodiment of any of the foregoing gas turbine engine embodiments, the buffer system can include a second bleed air supply and a valve that selects between the first bleed air supply and the second bleed air supply to communicate the buffer cooling air.

In a further embodiment of any of the foregoing gas turbine engine embodiments, the buffer system can include a controller that selectively operates the conditioning device.

In another exemplary embodiment, a gas turbine engine includes a compressor section, a combustor in fluid communication with the compressor section, a turbine section in fluid communication with the combustor, at least one shaft that interconnects the portion of the compressor section and the turbine section, and a bearing structure that supports the at least one shaft. The bearing structure can include a bearing compartment. A buffer system can selectively communicate a buffer cooling air to the bearing structure and axially along the at least one shaft.

In a further embodiment of the foregoing gas turbine engine embodiment, the buffer system can include a first bleed air supply and a conditioning device that conditions the first bleed air supply to render the buffer cooling air.

In a further embodiment of either of the foregoing gas turbine engine embodiments, the buffer system can include a first bleed air supply, a second bleed air supply, a valve that selects between the first bleed air supply and the second bleed air supply, and a conditioning device that conditions either the first bleed air supply or the said second bleed air supply to render the buffer cooling air.

In a further embodiment of any of the foregoing gas turbine engine embodiments, the conditioning device can include either a heat exchanger or an ejector.

In a further embodiment of any of the foregoing gas turbine engine embodiments, the gas turbine engine can include a high bypass geared aircraft engine having a bypass ratio of greater than about six (6).

In a further embodiment of any of the foregoing gas turbine engine embodiments, the gas turbine engine includes a low fan pressure ratio of less than about 1.45.

In yet another exemplary embodiment, a method of cooling a portion of a gas turbine engine includes communicating a buffer cooling air to at least a bearing structure of the gas turbine engine to pressurize a bearing compartment of the at least one bearing structure. The buffer cooling air can also be communicated axially along at least a portion of at least one shaft of the gas turbine engine.

In a further embodiment of the foregoing method embodiment, the step of communicating the buffer cooling air axially along at least a portion of the at least one shaft can include communicating the buffer cooling air along an outer diameter of the at least one shaft.

In a further embodiment of either of the foregoing method embodiments, the step of communicating the buffer cooling air axially along at least a portion of the at least one shaft can include communicating the buffer cooling air through an inner diameter of the at least one shaft.

In a further embodiment of any of the foregoing method embodiments, the step of communicating the buffer cooling air axially along at least a portion of the at least one shaft can include communicating the buffer cooling air along each of an inner diameter and an outer diameter of the at least one shaft.

In a further embodiment of any of the foregoing method embodiments, a bleed air supply is cooled prior to communicating the buffer cooling air.

The various features and advantages of this disclosure will become apparent to those skilled in the art from the following detailed description. The drawings that accompany the detailed description can be briefly described as follows.

DETAILED DESCRIPTION

Figure 1:
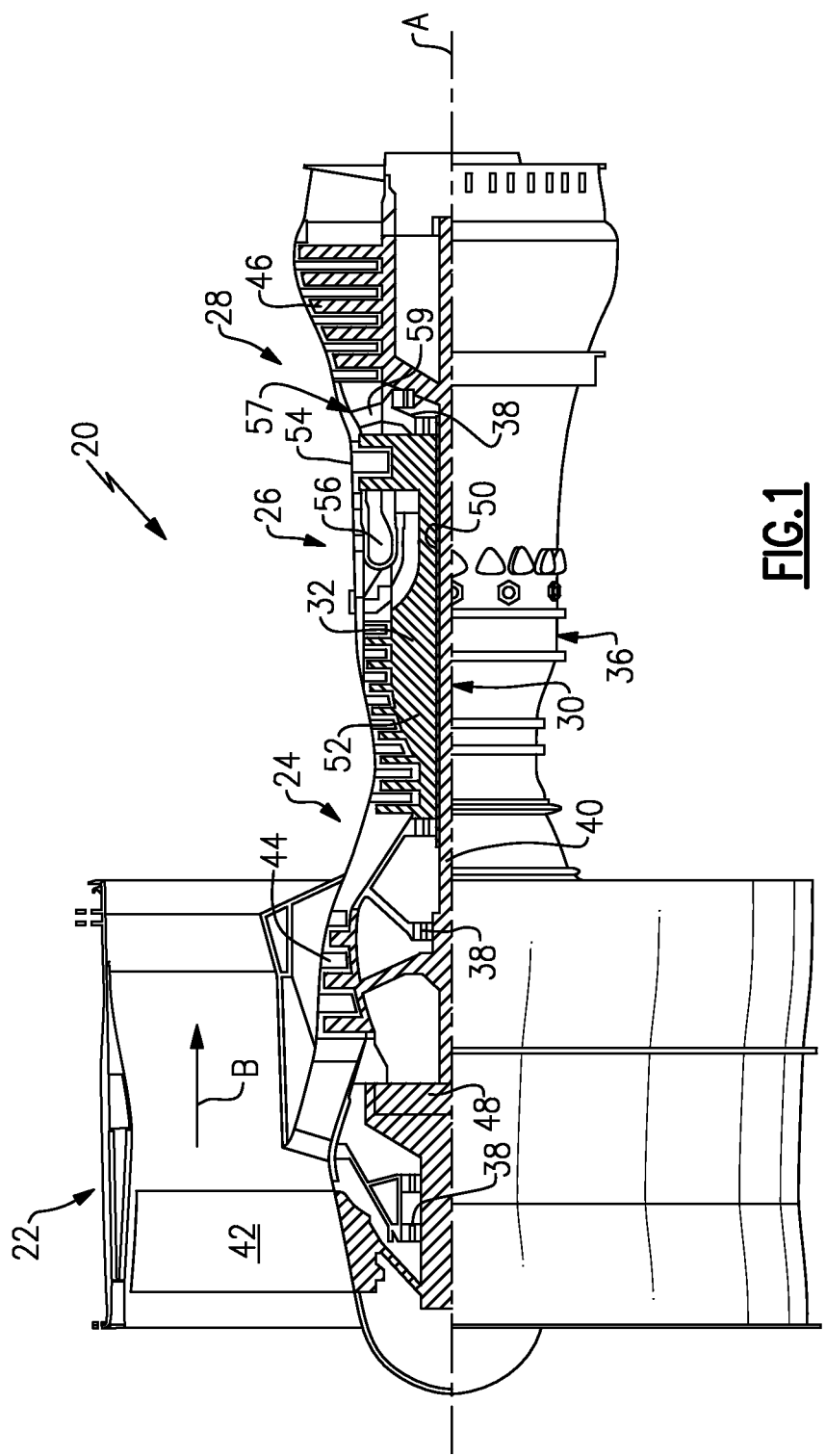
FIG. 1 is a cross-section of a gas turbine engine.

FIG. 1 is a cross-section of a gas turbine engine 20. The gas turbine engine 20 of this example is a two-spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path while the compressor section 24 drives air along a core flow path for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of turbine engines, including but not limited to three-spool engine architectures and land based engines.

The gas turbine engine 20 generally includes a low speed spool 30 and a high speed spool 32 mounted for rotation about an engine centerline longitudinal axis A relative to an engine static structure 36 via several bearing structures 38. It should be understood that various bearing structures 38 at various locations may alternatively or additionally be provided.

The low speed spool 30 generally includes an inner shaft 40 (i.e., a low shaft) that interconnects a fan 42, a low pressure compressor 44 and a low pressure turbine 46. The inner shaft 40 can be connected to the fan 42 through a geared architecture 48 to drive the fan 42 at a lower speed than the low speed spool 30. The high speed spool 32 includes an outer shaft 50 (i.e., a high shaft) that interconnects a high pressure compressor 52 and a high pressure turbine 54. In this example, the inner shaft 40 and the outer shaft 50 are supported at a plurality of axial locations by bearing structures 38 that are positioned within the engine static structure 36.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 can support one or more bearing structures 38 in the turbine section 28. The inner shaft 40 and the outer shaft 50 are concentric and rotate via the bearing structures 38 about the engine centerline longitudinal axis A, which is collinear with their longitudinal axes. The inner shaft 40 and the outer shaft 50 can be either co-rotating or counter-rotating with respect to one another.

The core airflow is compressed by the low pressure compressor 44 and the high pressure compressor 52, is mixed with fuel and burned in the combustor 56, and is then expanded over the high pressure turbine 54 and the low pressure turbine 46. The mid-turbine frame 57 includes airfoils 59 which are in the core airflow path. The high pressure turbine 54 and the low pressure turbine 46 rotationally drive the respective low speed spool 30 and the high speed spool 32 in response to the expansion.

In some non-limiting examples, the gas turbine engine 20 is a high-bypass geared aircraft engine. In a further example, the gas turbine engine 20 bypass ratio is greater than about six (6:1). The geared architecture 48 of the example gas turbine engine 20 includes an epicyclic gear train, such as a planetary gear system or other gear system. The example epicyclic gear train has a gear reduction ratio of greater than about 2.3. The geared architecture 48 enables operation of the low speed spool 30 at higher speeds which can increase the operational efficiency of the low pressure compressor 44 and low pressure turbine 46 and render increased pressure in a fewer number of stages.

The low pressure turbine 46 pressure ratio is pressure measured prior to inlet of low pressure turbine 46 as related to the pressure at the outlet of the low pressure turbine 46 of the gas turbine engine 20. In another non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). The geared architecture 48 of yet another embodiment is an epicyclic gear train with a gear reduction ratio of greater than about 2.5:1. It should be understood, however, that the above parameters are only exemplary of one embodiment of a geared architecture engine and that the present disclosure is applicable to other gas turbine engines including direct drive turbofans.

In this embodiment of the example gas turbine engine 20, a significant amount of thrust is provided by a bypass flow B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise. TSFC (Thrust Specific Fuel Consumption) is an industry standard parameter of fuel consumption per unit of thrust.

Fan Pressure Ratio is the pressure ratio across the fan section 22 without the use of a Fan Exit Guide Vane system. The low Fan Pressure Ratio according to one non-limiting embodiment of the example gas turbine engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Figure 2:
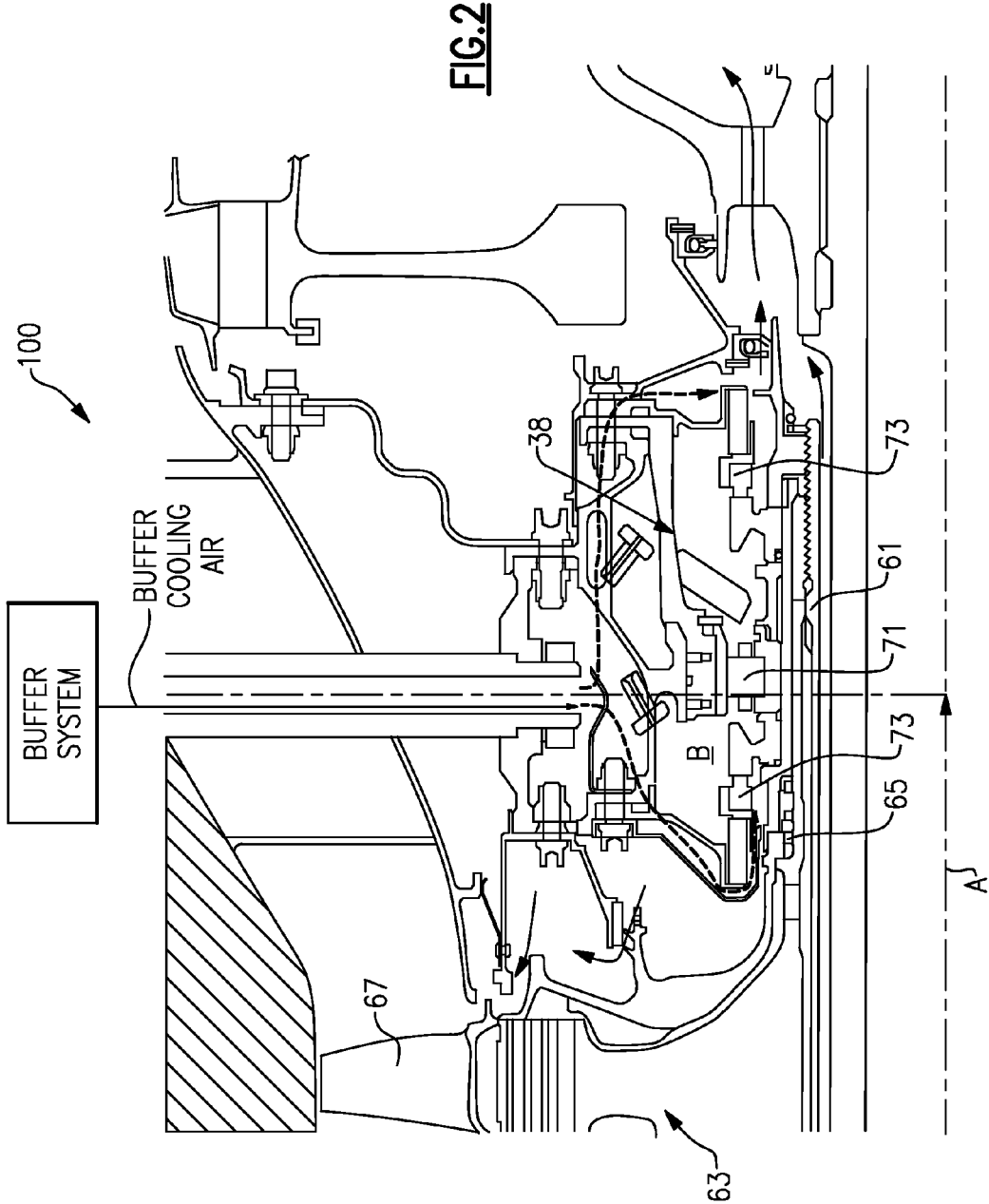
FIG. 2 is a schematic cross-section a gas turbine engine.

FIG. 2 illustrates a portion 100 of a gas turbine engine, such as the gas turbine engine 20. The portion 100 can include one or more bearing structures 38. Only one bearing structure 38 is depicted in FIG. 2 to schematically illustrate its features, but this is in no way intended to limit this disclosure.

The bearing structure 38 supports a shaft 61, such as the outer shaft 50, which supports a rotor assembly 63, such as a rotor assembly of the compressor section 24 or the turbine section 28, through a hub 65. In this example, the shaft 61 is a tie shaft that that connects the high pressure compressor 52 to the high pressure turbine 54. The rotor assembly 63 carries at least one airfoil 67 for adding or extracting energy from the core airflow.

The bearing structure 38 defines a bearing compartment B that houses one or more bearings 71. The bearing compartment B contains a lubricant for lubricating (and acting as a cooling medium to) the bearings 71. One or more seals 73 (two shown) contain the lubricant within the bearing compartment B. The seals 73 of the bearing compartment B must be pressurized to prevent the lubricant from leaking out during certain flight conditions, both steady state and transient. A buffer system can be used to communicate buffer supply air to the bearing compartment B in order to provide adequate pressurization of the seals 73 without exceeding material and/or lubricant temperature limitations. Example buffer systems that can be used for this and other purposes, including cooling at least one shaft, are detailed below.

Figure 3:
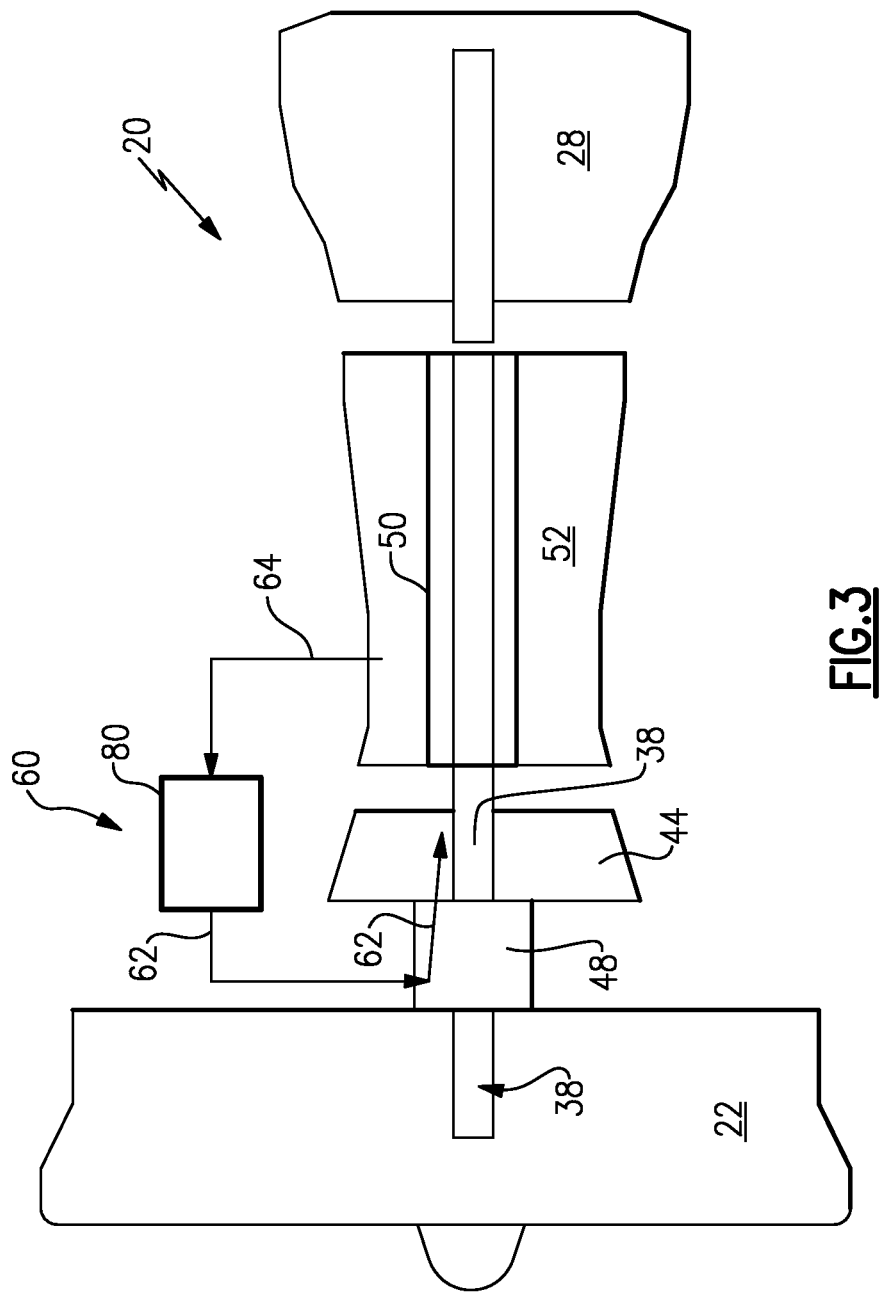
FIG. 3 is a schematic of an example buffer system of the gas turbine engine.

FIG. 3 illustrates an example buffer system 60 that can communicate a buffer cooling air 62 to a first portion of the gas turbine engine 20, such one or more bearing structures 38 (shown schematically in FIG. 3) and a second portion of the gas turbine engine 20, such as to the inner shaft 40 (shown schematically in FIG. 4) of the gas turbine engine 20. The buffer cooling air 62 pressurizes the outside of the bearing compartment(s) of the bearing structure(s) 38 to maintain sufficient pressure differential between the buffer cavity and the inner bearing compartment cavity and maintain bearing compartment seal leakage inflow at an acceptable temperature. The buffer cooling air 62 can also be used to cool the inner shaft 40 (and optionally the outer shaft 50, see FIG. 1) to acceptable operating temperatures. By cooling the inner and outer shafts 40, 50 with the buffer cooling air 62, the inner and outer shafts 40, 50 can be manufactured using relatively low temperature capable materials rather than exotic, high cost, and difficult to manufacture alloys. Example low temperature capable materials include steel or stainless steel among other known materials.

The buffer system 60 of FIG. 3 may include a bleed air supply 64 and a conditioning device 80. The bleed air supply 64 may be sourced from the fan section 22, the low pressure compressor 44 or the high pressure compressor 52. In the illustrated non-limiting example, the bleed air supply 64 is sourced from a middle stage of the high pressure compressor 52. The conditioning device 80 can cool and/or otherwise condition the bleed air supply 64 to render a buffer cooling air 62 having an acceptable temperature for buffering the environment surrounding the bearing structures 38 and the inner shaft 40. The conditioning device 80 could include an air-to-air heat exchanger, a fuel-to-air heat exchanger, or any other suitable heater exchanger.

Figure 4:
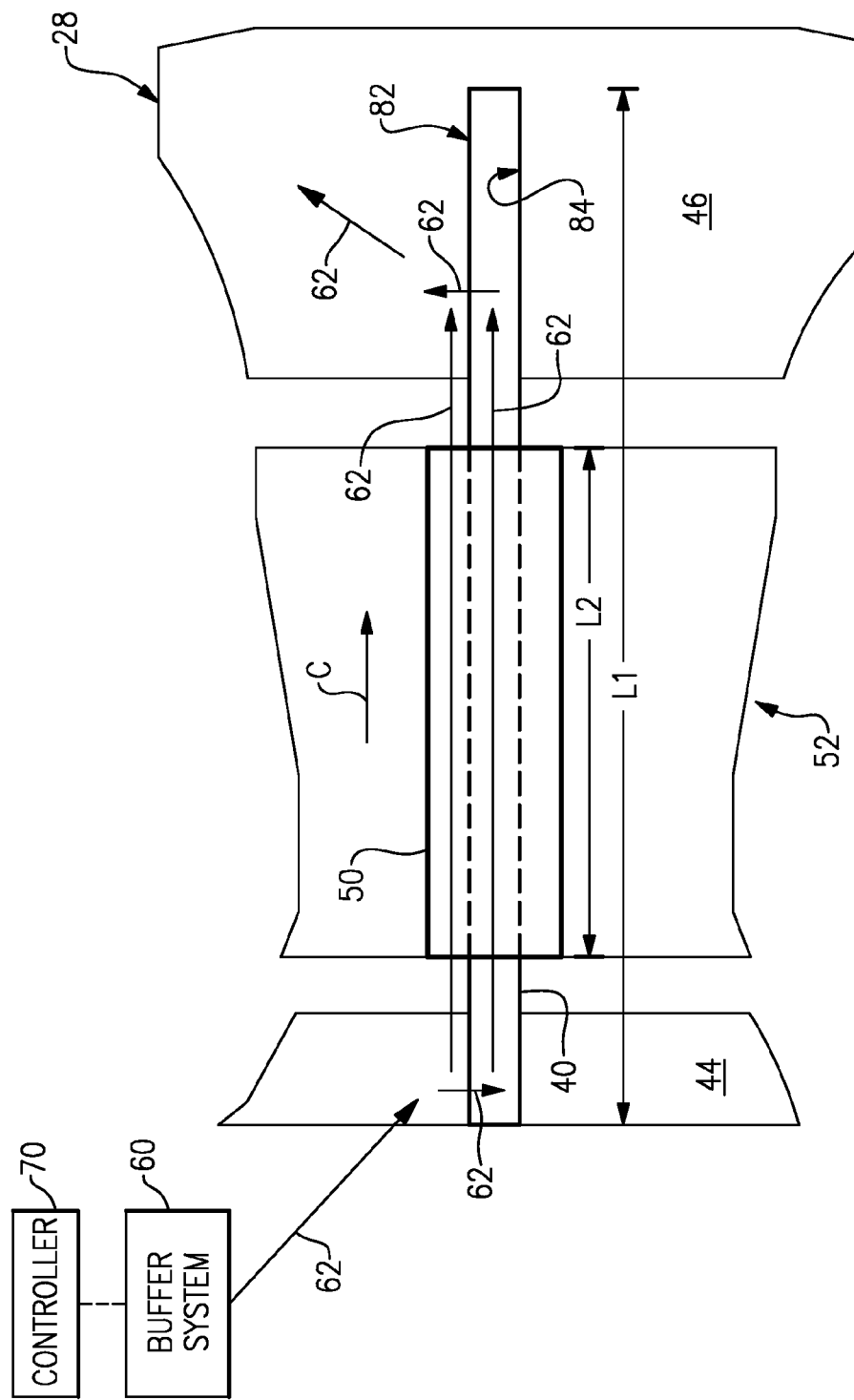
FIG. 4 illustrates additional aspects of the buffer system of FIG. 3.

Referring to FIG. 4, the buffer cooling air 62 may be communicated from the conditioning device 80 to a bearing structure 38, then axially along an outer diameter 82 of the inner shaft 40 (i.e., between the inner shaft 40 and the outer shaft 50), and then downstream to the turbine section 28 to cool other bearing structures or for turbine ventilation purposes. The outer shaft 50, which in this example is a tie shaft that interconnects the high pressure compressor 52 and the high pressure turbine 54, isolates the inner shaft 40 from potentially hotter compressor ventilation airflow C supplied from the same or different source. The compressor ventilation airflow C may be hotter than the inner shaft 40 as a result of heat transfer with the hardware of the compressor section 24.

The buffer cooling air 62 may also be simultaneously communicated axially along and through an inner diameter 84 of the inner shaft 40 where the inner shaft 40 is hollow. It should be understood that the buffer cooling air 62 may be communicated along the outer diameter 82, along the inner diameter 84, or both at the same time. The buffer cooling air 62 may condition the bearing structures 38 and the inner and outer shafts 40, 50 as it is communicated along this path. In this example, the buffer cooling air 62 is communicated substantially along an entire axial length L1 of the inner shaft 40 and an entire axial length L2 of the outer shaft 50. However, the buffer cooling air 62 could be communicated along only portions of the axial lengths L1, L2 depending on how and where the buffer cooling air 62 is piped to the inner shaft 40 and the outer shaft 50.

Although shown schematically, the buffer cooling air 62 is communicated between the conditioning device 80, the bearing structures 38 and the inner and outer shafts 40, 50 via buffer tubing, conduits, or other passageways. Such tubing, conduits and/or passageways could be routed throughout the gas turbine engine 20. The type, location and configuration of such tubing, conduits and/or passageways are not intended to limit this disclosure.

The buffer system 60 may also include a controller 70. The controller 70 can be programmed to selectively command the communication of buffer cooling air 62 during certain operating conditions. The controller 70 may also potentially generate a signal to command operation of the conditioning device 80 and/or a source-switching valve. Also, although shown as a separate feature, the controller functionality could be incorporated into the conditioning device 80. The buffer system 60 is operable to communicate buffer cooling air 162 for responding to any engine operating condition.

Figure 5:
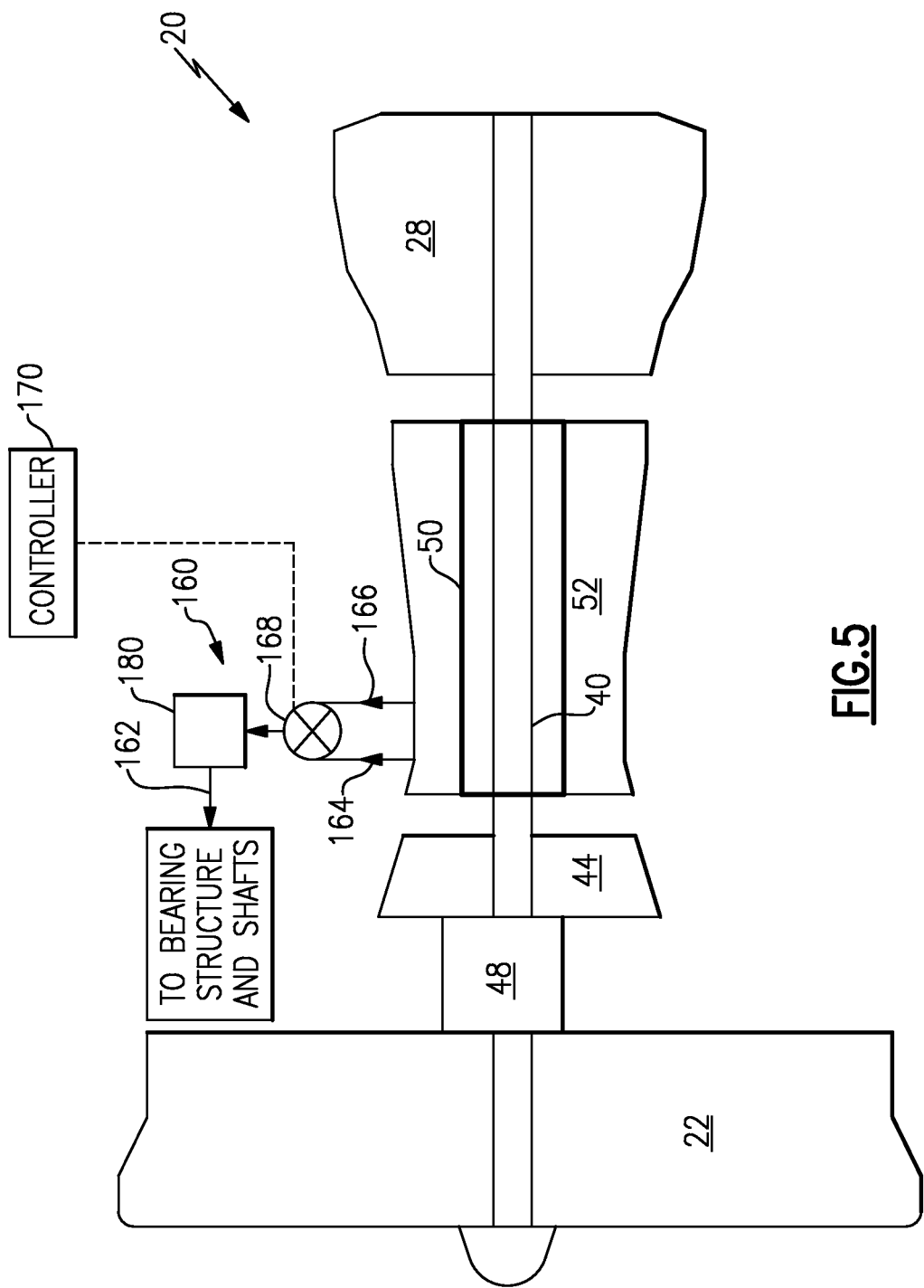
FIG. 5 is a schematic of another example of a buffer system.

FIG. 5 illustrates another example buffer system 160 that may be used to supply a buffer cooling air 162 to pressurize a bearing structure 38 and cool the inner and outer shafts 40, 50 of the gas turbine engine 20. In this example, the buffer system 160 is a multi-source buffer system that includes a first bleed air supply 164 and a second bleed air supply 166. In the exemplary embodiment, the first bleed air supply 164 is a low pressure bleed air supply and the second bleed air supply 166 is a high pressure bleed air supply that includes a pressure that is greater than the pressure of the first bleed air supply 164.

The first bleed air supply 164 may be sourced from the fan section 22, the low pressure compressor 44 or the high pressure compressor 52. In the illustrated non-limiting example, the first bleed air supply 164 is sourced from an upstream stage of the high pressure compressor 52. However, the first bleed air supply 164 could be sourced from any location that is upstream from the second bleed air supply 166. The second bleed air supply 166 may be sourced from the high pressure compressor 52, such as from a middle or downstream stage of the high pressure compressor 52. The second bleed air supply 166 could also be sourced from the low pressure compressor 44 or the fan section 22 depending on where the first bleed air supply 164 is sourced from.

The buffer system 160 may also include a valve 168 that is in communication with both the first bleed air supply 164 and the second bleed air supply 166. Although shown schematically, the first bleed air supply 164 and the second bleed air supply 166 can be in fluid communication with the valve 168 via buffer tubing, conduits, or other passageways.

In the exemplary embodiment, the valve 168 may select between the first bleed air supply 164 and the second bleed air supply 166 to communicate a buffer cooling air 162 having a desired temperature and pressure to desired portions of the gas turbine engine 20. The valve 168 communicates either the first bleed air supply 164 or the second bleed air supply 168 to a conditioning device 180 to cool the air supply and render the buffer cooling air 162.

The valve 168 can be a passive valve or a controller base valve. A passive valve operates like a pressure regulator that can switch between two or more sources without being commanded to do so by a controller, such as an engine control (EEC). The valve 168 of this example uses only a single input which is directly measured to switch between the first bleed air supply 164 and the second bleed air supply 661.

The valve 168 could also be a controller based valve. For example, the buffer system 160 could include a controller 170 in communication with the valve 168 for selecting between the first bleed air supply 164 and the second bleed air supply 166. The controller 170 is programmed with the necessary logic for selecting between the first bleed air supply 164 and the second bleed air supply 166 in response to detecting a pre-defined power condition of the gas turbine engine 20. The controller 170 could also be programmed with multiple inputs.

The determination of whether to communicate the first bleed air supply 164 or the second bleed air supply 166 as the buffer cooling air 162 is based on a power condition of the gas turbine engine 20. The term "power condition" as used in this disclosure generally refers to an operability condition of the gas turbine engine 20. Gas turbine engine power conditions can include low power conditions and high power conditions. Example low power conditions include, but are not limited to, ground operation, ground idle and descent idle. Example high power conditions include, but are not limited to, takeoff, climb, and cruise conditions. It should be understood that other power conditions are also contemplated as within the scope of this disclosure.

In one exemplary embodiment, the valve 168 communicates the first bleed air supply 164 (which is a relatively lower pressure bleed air supply) to the conditioning device 180 in response to identifying a high power condition of a gas turbine engine 20. The second bleed air supply 166 (which is a relatively higher pressure bleed air supply) is selected by the valve 168 and communicated to the conditioning device 180 in response to detecting a low power condition of the gas turbine engine 20. Both sources of bleed air are intended to maintain the same minimum pressure delta across the bearing compartment seals. Low power conditions require a higher pressure stage source to maintain adequate pressure differential, while high power conditions can meet requirements with a lower stage pressure source. Use of the lowest possible compressor stage can to meet the pressure requirements and minimize supply temperature and any negative performance impact to the gas turbine engine 20.

The conditioning device 180 of the buffer system 160 could include a heat exchanger or an ejector. An ejector adds pressure (using a small amount of the second bleed air supply 166) to the first bleed air supply 164 to prepare the buffer supply air 162.

Although the different examples have a specific component shown in the illustrations, embodiments of this disclosure are not limited to those particular combinations. It is possible to use some of the components or features from one of the examples in combination with features or components from another one of the examples.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
 a fan section;
 a compressor section;
 a combustor in fluid communication with said compressor section;
 a turbine section in fluid communication with said combustor;
 an inner shaft that interconnects first portions of said compressor section and said turbine section;
 an outer shaft that interconnects second portions of said compressor section and said turbine section;
 a geared architecture that connects said fan section to said inner shaft;
 a bearing structure supporting at least one of said inner shaft and said outer shaft, said bearing structure including a bearing compartment;
 a buffer system including a conditioning device configured to prepare a buffer cooling air, said buffer system configured to communicate said buffer cooling air to said bearing structure and then from said bearing structure axially along said inner shaft to pressurize said bearing compartment and cool both said inner shaft and said outer shaft;
 the gas turbine engine including a Fan Pressure Ratio of less than 1.45 during operation of said fan section; and
 the gas turbine engine is a high bypass geared aircraft engine having a bypass ratio of greater than six (6).

2. The gas turbine engine as recited in claim 1, wherein said buffer cooling system is configured to communicate said buffer cooling air between said inner shaft and said outer shaft.

3. The gas turbine engine as recited in claim 1, wherein said buffer cooling system is configured to simultaneously communicate said buffer cooling air along both an outer diameter and an inner diameter of said inner shaft.

4. The gas turbine engine as recited in claim 1, wherein said buffer system includes a first bleed air supply and said conditioning device configured to condition said first bleed air supply to render said buffer cooling air.

5. The gas turbine engine as recited in claim 1, wherein said buffer system includes a first bleed air supply, a second bleed air supply, a valve configured to select between said first bleed air supply and said second bleed air supply, and said conditioning device configured to condition one of said first bleed air supply and said second bleed air supply to render said buffer cooling air.

6. The gas turbine engine as recited in claim 1, wherein said buffer system includes a controller programmed to selectively command communication of said buffer cooling air in response to an engine operating condition.

* * * * *